T. T. & G. T. THORNE.
Cotton Planter.
No. 99,499. Patented Feb. 1, 1870.
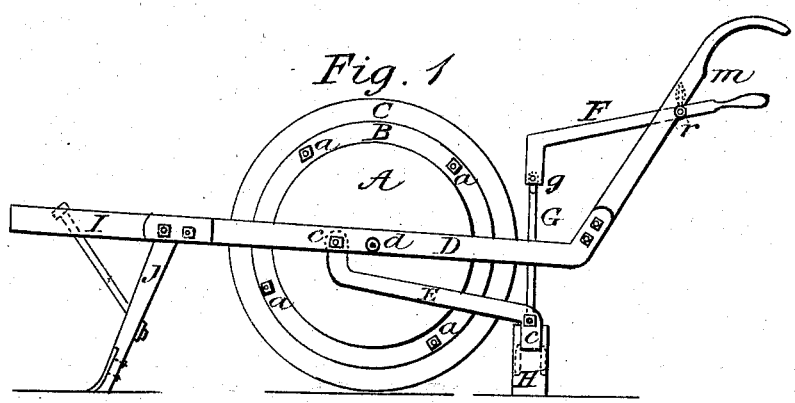
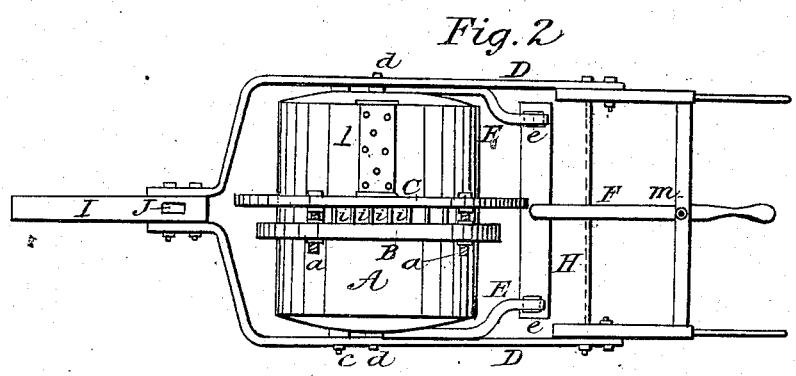
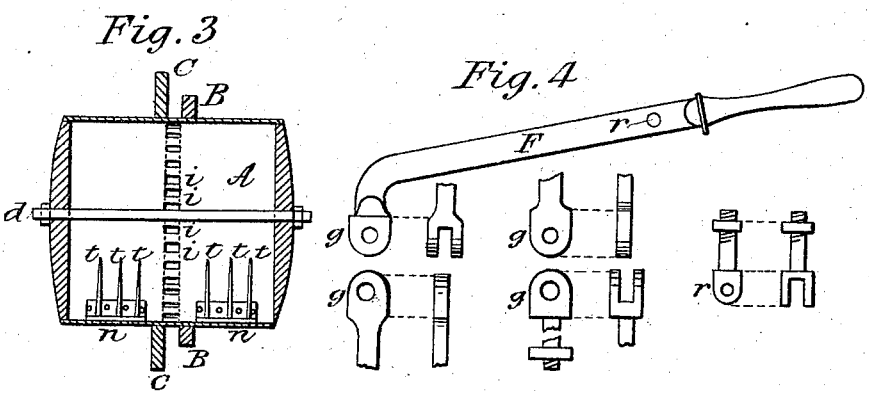
Witnesses:
Inventors

United States Patent Office.

T. T. THORNE AND G. T. THORNE, OF WHITAKER'S STATION, NORTH CAROLINA.

Letters Patent No. 99,499, dated February 1, 1870.

IMPROVEMENT IN COTTON-PLANTERS.

The Schedule referred to in these Letters Patent and making part of the same

*To all whom it may concern:*

Be it known that we, T. T. THORNE and G. T. THORNE, of Whitaker's Station, Edgecombe county, and State of North Carolina, have invented an Improved Cotton-Planter; and we do hereby declare the following to be an exact description thereof, reference being had to the accompanying drawings, and to the letters of reference marked thereon, making a part of this specification, in which—

Figure 1 represents a side elevation of the planter;

Figure 2, a top view of the same;

Figure 3 is a sectional view of the seeding-cylinder; and

Figure 4 shows the lever that operates the coverer, and raises and lowers it by the connections $g$, $o$, and $r$.

The nature of our invention consists in the arrangement of the straight seeding-cylinder, with its central wheel, oblong seeding-apertures, and adjustable central flange, for regulating the size of the apertures according to the quantity of seed to be sown; the coverer, with its adjustable lever; the knives inside of cylinder; and the square iron post in front, that supports the opener, to prevent the opener from getting broken by any stump or other obstruction; the object of our invention being to sow cotton or any kind of grain by a simple and cheap machine.

To enable others to make and use our invention, we will proceed to describe its construction and operation, as follows, to wit:

A represents the cylinder—that is, a straight cylinder, having straight knives, $t$, on the inside, for separating the cotton from the seed, and preventing the cotton from clogging or tangling in the cylinder, or against the knives.

The knives project from the cylinder, on each side of the oblong seeding-apertures $i\ i$, that surround the cylinder on the one side of the central carriage-wheel C.

Another outside wheel or adjustable flange, B, less in circumference than the main wheel C, is attached to the wheel C by adjustable bolts and nuts, $a\ a$. This flange is adjusted to or from the wheel C, and over the apertures $i\ i$, for the purpose of increasing or diminishing the size of the seeding-apertures $i\ i$, according to the size and character of the grain or seed required to be sown.

L is a hinged door, that closes the apertures through which the seed is passed into the seeding-cylinder A.

$n\ n$ are the flat iron plates that hold the angular ends of the knives $t$ to the inside of the cylinder, the knives being thus fastened along the whole length of the cylinder A by means of permanent screws or rivets, there being three or more projecting knives on each side of the seeding-apertures $i$.

The cylinder revolves on its axle $d$, the journals of which operate in the side frame D—that is, an iron bar on each side of the cylinder, that supports also the handles of the planter, the tongue I, the post J, to which the opener is attached, and the pivoted side bars E E, that drag the coverer H.

G is an upright rod, extending from the centre of the coverer H to the joint or fulcrum $g$ of the lever F.

This lever F works also on a pivot, $r$, of a clip, $m$, bolted to the cross-piece that braces the handles of the machine.

The coverer is self-acting, according to the unevenness of the ground, but is raised or lowered, when required, by the operator pressing upon the lever F.

The post or iron bar J, that supports the opener in front, is fastened strongly to the front frame of the machine, and is made square, and set at an incline, instead of being straight, as usual, so as to prevent the opener from being broken when brought accidentally against any obstruction.

What we claim as our invention, and desire to secure by Letters Patent, is—

1. The construction of the straight cylinder A, with its straight knives $t$ on the inside, oblong apertures $i$, with their adjustable flange B on the outside, and centre wheel C, when combined and operating as herein described, and for the purpose set forth.

2. The post J, coverer H, with its jointed lever F, and side bars E, as attached to the side bars D, when arranged and operating as herein described, and for the purpose set forth.

T. T. THORNE.
G. T. THORNE.

Witnesses:
I. H. PIPER,
J. D. PATTEN.